Jan. 12, 1960 B. F. ADAMS 2,920,977
CELLULAR SURFACE COVERINGS HAVING AN EMBOSSED APPEARANCE
Filed Aug. 19, 1956
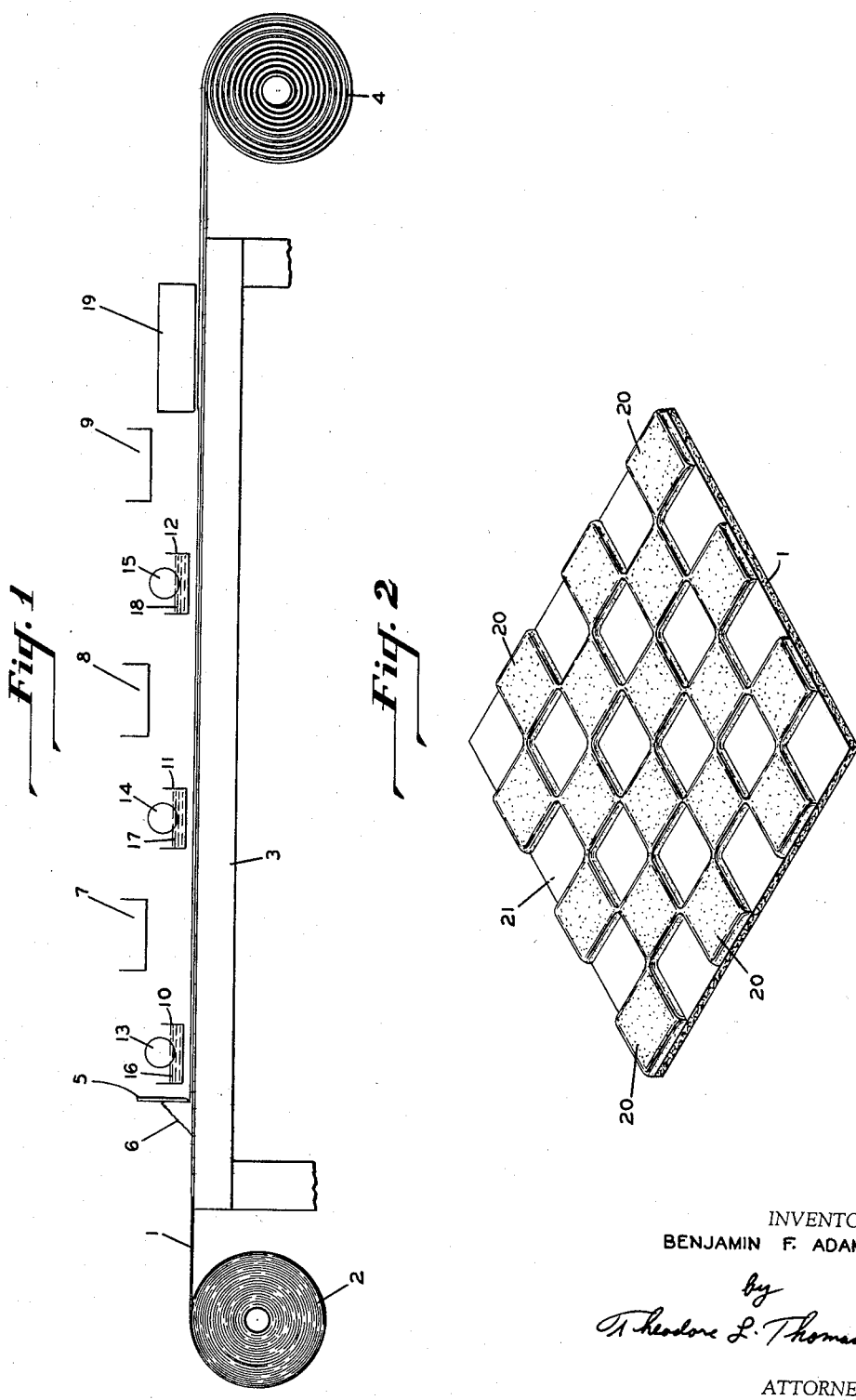
INVENTOR
BENJAMIN F. ADAMS
by
Theodore L. Thomas
ATTORNEY United States Patent Office
2,920,977
Patented Jan. 12, 1960

2,920,977

CELLULAR SURFACE COVERINGS HAVING AN EMBOSSED APPEARANCE

Benjamin F. Adams, Lancaster, Pa., assignor to Armstrong Cork Company, Lancaster, Pa., a corporation of Pennsylvania Application April 19, 1956, Serial No. 579,154

7 Claims. (Cl. 117—15)

This invention relates to surface coverings, and more particularly to surface coverings comprising a cellular vinyl layer. Still more particularly, it relates to surface coverings presenting an embossed appearance and having a layer of a foamed vinyl composition and a supporting layer therefor.

It is the primary object of the present invention to present a surface covering suitable for use on walls, floors, and other surfaces, and which is resilient, tough, flexible, and highly resistant to chemical action of all kinds. It is a further object to present a surface covering possessing an unusual degree of softness and resiliency in use, while at the same time retaining the necessary characteristics of strength and toughness. It is a still further object of the present invention to present a foamable print paint from which may be prepared a surface covering presenting an attractive sculptured or embossed appearance, which covering, however, dispenses with the need for the usual embossing operation.

To this end, the invention contemplates a cellular vinyl layer and a supporting layer therefor prepared by printing a plurality of polyvinyl halide compositions on a supporting layer in a pattern or design. At least one of these compositions must be a foamable composition which comprises a polyvinyl halide composition, plasticizer, and a blowing agent. After the compositions have been printed on the supporting layer, the compositions are subjected to heat to decompose the blowing agent and to fuse the polyvinyl resin.

The supporting layer used in the present invention may be chosen according to the need for the final product. A wide choice of materials available as a supporting layer may be made. For example, there may be used felt, cotton sheeting, glass cloth, burlap, and plastic or resinous films. It is preferred that the supporting layer be flexible and that it conform generally with those known requirements in the surface covering art which render a supporting layer useful. For example, where the supporting layer is an asphalt saturated felt or a beater saturated felt, the constituents on the felt fiber should be such that no harmful reaction will occur between those constituents and the other components of the surface covering material. As far as a flooring felt is concerned, the known oleoresinous compositions and the resin-rubber compositions normally used in flooring felt will exert no deleterious effect on the product of the present invention. In any case, the supporting layer which forms part of the product of the present invention may be filled or unfilled, and may, if desired, be coated with a protective coating paint, as for example a casein paint. Thus, the supporting layer may comprise filled or unfilled flexible sheet goods, or it may be a unitary film prepared from resins, and preferably vinyl resins. In this last case, the supporting layer may comprise a nonfoamed vinyl resin dispersion which has been deposited on a strippable carrier such as tinplate, aluminum sheathing, coated felt, and the like, by knife coating, printing, spraying, or other suitable means. This film may be completely fused, partially fused, or not fused at all before further treatment. The film may be stripped from the strippable carrier prior to the application of the cellular vinyl layer, or it may be left on the strippable carrier throughout the process of the present invention and stripped from the carrier at the end of the process. It is apparent that the supporting layer may be of any desirable color and may, in the case of a unitary resinous sheet, possess decorative or pattern effects by incorporating pigments, fillers, and by the use of any of the known means to form designs or other attractive effects.

Although the foamable composition to be applied to the supporting layer may be varied widely to meet the requirements of the particular product desired, certain conditions and requirements will produce preferred products. The foamable composition comprises a polyvinyl halide resin of particle size averaging less than about 5 microns, and preferably less than about 1½ microns. The polyvinyl halide resin, preferably polyvinyl chloride, in such particles is present in high molecular weight, greater than about 3,000. Polyvinyl chloride or vinyl chloride-vinyl acetate copolymer of lower molecular weight or of larger average particle size than that described does not allow the production of a cellular vinyl layer as suitable for use as a floor or wall covering. Suitable polyvinyl chloride for the present invention may be purchased under the trademark "Geon 121."

The foamable composition used in the present invention must also contain at least one plasticizer. Primary plasticizers alone may be used, or combinations of primary and secondary plasticizers may be used. As a primary plasticizer or dispersant, it is preferred to use the known ester type primary plasticizer. Examples of such plasticizers are tricresyl phosphate, dioctyl phthalate, and similar compounds. The amount of total plasticizer to be used will vary between about 20–120 parts by weight per 100 parts by weight of the polyvinyl halide resin. The precise amount in this range may be selected according to the viscosity desired in the foamable composition or to obtain specific properties in the foam or foamable composition. To some extent, the amount of plasticizer controls the elongation and flexibility of the cellular vinyl product. Higher amounts of plasticizer yield a more flexible product, while smaller amounts within the range given yield a tougher product having a higher tensile strength.

In addition to the primary plasticizers mentioned above, there may be used, if desired, the so-called secondary plasticizers. Use of the secondary plasticizers is often advantageous where an unusually large expansion is desired. The secondary plasticizers may also be used where it is desired to raise the fusion point of the resin so that the temperature of decomposition of the blowing agent is not too high with respect to the fusion temperature of the polyvinyl halide resin. As examples of the suitable secondary plasticizers, there may be mentioned the polymeric type plasticizers examplified by the product sold under the name "Paraplex G-53" by Rohm and Haas Company. Other suitable secondary plasticizers are "MPS-500" (methyl pentachlorostearate) and the material named "Kenflex A," a polymeric hydrocarbon. The secondary plasticizers may be used in amounts from about 1–90 parts by weight per 100 parts by weight of the polyvinyl chloride resin in conjunction with primary plasticizer to yield a total plasticizer content of 20–120 parts per 100 parts of resin. The exact amount to be used, if any, will be determined by the properties desired in the product, and by the fusion point desired during the fusion step.

The composition should also include preferably a stabilizer to aid in minimizing degradation caused by any hydrochloric acid released by polyvinyl chloride breakdown. Such stabilizers may be basic lead sulfate such as is sold under the name "Tribase," or it may be dibasic lead phosphate sold under the name "Dyphos," or "Thermolite 31," an organo-tin compound, and similar compounds. The stabilizers are used generally in the amount of 0.5–5 parts by weight per 100 parts by weight polyvinyl chloride resin.

There may also be added other compounds which serve to give a more homogeneous foam. Such compounds are dibutyl tin dilaurate and octylene glycol titanate. These compounds when used at all should be used in an amount in the range of about 0.5–5 parts by weight per 100 parts by weight resin.

In accordance with good print paint practice, it is preferred that a wetting agent be present in the composition. Those wetting and dispersing agents customarily used in connection with vinyl dispersion resins will serve in the present composition. Certain resins such as urea-formaldehyde resins, particularly those sold under the name "Uformite," also serve to improve the flow characteristics of the composition. The wetting or dispersing agents when used will be present in an amount of about 0.5–5 parts by weight per 100 parts by weight polyvinyl chloride resins.

The composition may also contain, if desired, additional resins such as hydrogenated rosin, rosin modified alkyd resins, chlorinated long chain hydrocarbons, chlorinated aromatic hydrocarbons, and the like. The role of these additional resins is to alter to some extent the properties of the final foamed composition. Thus, some degree of control over the final properties may be obtained in the final cellular product where such is desirable by the use of additional resins.

It is apparent that the composition thus far described is a true plastisol. However, in view of the necessity for ease of flow in a paint, it is preferred to incorporate a solvent or diluent in the plastisol composition. Aromatic hydrocarbons or other suitable diluents added in small amounts will serve to expedite the use of the composition as a printing paint. The aromatic hydrocarbon solvent sold under the name of "Solvesso 150" is preferred. The amount of solvent or diluent should not be too large; otherwise, the composition will not foam properly. Generally speaking, no more than about 150 parts by weight solvent per 100 parts by weight resin can be used, and preferably the amount of solvent is maintained at less than about 30 parts by weight solvent per 100 parts by weight resin.

The composition of the present invention may also contain varying amounts of fillers and pigments. The total amount of filler may be as high as about 100 parts by weight per 100 parts by weight resin, but lesser amounts are preferred. The fillers may be those known fillers which are customarily used in flooring compositions. Exemplary of such fillers are limestone, mica, barytes, wollastonite, slate flour, the clays, and those pigments which also serve as fillers, for example, titanium dioxide. Filler flocks such as "Solkafloc" or dyed or undyed decorative flocks such as cotton, rayon, nylon, and goat hair may be used. Although, as has been mentioned, the amount of filler can be 100 parts by weight per 100 parts by weight polyvinyl chloride resin, it is preferred that the amount of filler where filler is used be maintained in the range of about 15–30 parts by weight per 100 parts by weight polyvinyl halide resin. It must be emphasized that many compositions to be used in the present invention may not require any filler at all.

As a final component in the composition to be used in the present invention, there must be a blowing agent. These blowing agents or pneumatogens are chemical compounds which decompose under the action of heat to yield a gas. The release of gas in a soft composition forms cells or pores therein. Under proper conditions, the plastic composition containing the cells or pores formed from the release of gas may be obtained as a cellular product ranging from a soft, flexible foam to a hard, rigid foam. The softness of the cellular product will be determined, to a large extent, by the composition of the material foamed. In the present case, the composition as outlined above and as to be further described is such that neither a very soft nor a very hard foam will be formed. Instead there will be formed a tough yet resilient foam pre-eminently suitable for use as a surface covering. Blowing agents suitable in the present invention may be inorganic or organic agents. Where inorganic agents are used, however, greater quantities must be incorporated and there is slightly more nonuniformity in cell size as compared with the organic agents. As examples of suitable inorganic blowing agents, there may be mentioned sodium bicarbonate and ammonium bicarbonate. The amount of such agents to be used will vary between about 10–30 parts by weight per 100 parts by weight resin. As examples of organic blowing agents, there may be mentioned the p,p'-oxy bis (benzene sulfonyl hydrazide), sold under the name "Celogen." There may also be used benzene sulfonyl hydrazide, dinitro pentamethylenetetramine, and similar agents. Many suitable organic blowing agents are available on the market under various trade names. It is preferred, of course, that a blowing agent be utilized which does not discolor the final product and which gives uniform cell size and which has a satisfactory decomposition point. It is sometimes preferred to use a mixed blowing agent system in order to obtain fine control over the release of gas. Additives such as BL–425 (sodium alkyl sulfonate in dioctyl phthallic), sold by the Du Pont Company, and other additives may be added to modify expansion of the system. Thus, a blowing agent system pre-eminently suitable for use in the forming of the present invention will be "Celogen," 1–5 parts by weight; BL–425, 5–10 parts by weight; BL–353 (N,N'-dimethyl, N,N' dinitroso terephthalamide, 70% in mineral oil), 10–15 parts by weight; all of these based on 100 parts by weight of polyvinyl halide resin. Although the amount of a blowing agent may vary between 1–40 parts by weight per 100 parts polyvinyl halide resin, it is preferred that the amount be in the range of about 10–30 parts.

In summary, the composition to be utilized in preparing the product of the present invention may contain the following ingredients within the stated ranges:

| Ingredients | Parts by Weight |
| --- | --- |
| Polyvinyl halide resin of small particle size | 100. |
| Primary plasticizer | 20–120 (total plasticizer). |
| Secondary plasticizer | 0–70. |
| Stabilizer | 0.5–5.0. |
| Fillers and pigments | 0–100. |
| Blowing agent system | 1–40. |
| Wetting agents | 0.5–5. |
| Solvent | 0–150. |

The compositions are made using known technics for the preparation of plastisols and organosols as print paints. If the modifying resin or secondary plasticizer used is solid or semisolid, it may be dispersed in the primary plasticizer using heat if necessary. On cooling, the remaining plasticizer is added and then the vinyl resin may be stirred in using a Pony mixer or other suitable stirrer. Next there is blended in the stabilizer, the pigments, and the blowing agent. The mass is then ground on a three-roll mill, using cooling if necessary to prevent temperature rise, or the mass is blended on a dispersator. The fillers may be stirred in on a Pony or other suitable mixer; alternatively the fillers may be added prior to grinding or dispersating. Finally, the solvent is blended in with the mixture, if any solvent is to be used; a part or all of the solvent may be added prior to the grinding step.

As mentioned earlier, the foamable plastisol or organosol is to be applied to a supporting layer. It is a preferred embodiment of the present invention that the resin dispersion be applied in definite patterns to a supporting layer by printing, as by block printing, a design on the supporting layer. Dispersions having different colors may be used to form a multicolored design. Each color may contain a different amount of a blowing agent or a different chemical compound as a blowing agent from that present in the other colors, and each color may be deposited with a film thickness different from one or all the others.

When the supporting layer bearing the design printed in a foamable dispersion is subjected to sufficient heat, the blowing agent decomposes and the resin fuses. Since some areas of the design may be expanded more than others, either by use of differing amounts of blowing agents, or different blowing agents, or by depositing different wet film thicknesses, the final product will present a sculptured, carved, or other embossed design effect. Certain portions of the pattern may be left unfoamed if desired. In any case, in accordance with the present invention the embossed effect is achieved without the use of embossing rolls or any other means of sculpturing the design. The effect is achieved solely by differential foaming of the different portions of the design.

As mentioned earlier, flock may be used as a filler in the dispersion utilized in the present invention. The flock may be of any kind of fiber and the fiber lengths may vary to some extent. The length may be quite short, as for example about 20 mils, or they may be up to about ¼" long. Since the dispersion is used as a printing paint, it is preferred that the fiber length be not sufficiently long to destroy the use of the dispersion as a paint, particularly with block printing equipment. Interesting and unusual pattern effects may be achieved by dyeing or otherwise coloring the flock before incorporating it into the dispersion. In addition to providing decorative effects, the flock imparts a desirable hand to the sheet and strengthens the over-all structure.

In the drawings:

Fig. 1 schematically illustrates the method of the present invention; and

Fig. 2 illustrates a simple product of the present invention.

Referring to Fig. 1, the supporting layer 1 passes from the feed roll 2 down the printing table 3 to the wind-up roll 4. If desired a doctor blade 5 is used to deposit a coating layer onto the supporting layer 1 by means of the bank 6 of coating material. Print blocks 7, 8, and 9 are adapted to move up and down in a vertical direction to print a design onto the face of the supporting layer 1; the mechanism for moving the print blocks is not shown. Print paint reservoirs 10, 11, and 12 are adapted by suitable mechanism, not shown, to move in a horizontal direction under the print blocks so that the applicator rolls 13, 14, and 15 apply print paint to the under surface of the print blocks. The applicator rolls are immersed in part in suitable print paint compositions 16, 17, and 18. Mechanism for establishing a suitable stop-and-go motion to the supporting layer 1 as it moves down the print table 3 is not shown. When the surface of the supporting layer 1 has been covered with print paint in a suitable design, the printed supporting layer passes beneath a suitable heater 19 which, by any convenient means, supplies sufficient heat to the printed layer to fuse the polyvinyl halide print paint composition and to decompose the blowing agent contained in at least one of those compositions. On cooling, the product may be stored as by wind-up roll 4.

Fig. 2 illustrates a product wherein two polyvinyl halide compositions have been used. The supporting layer 1 carries thereon expanded portions 20 and non-expanded portions 21. It is apparent that expanded portions 20 could be of differing thicknesses by simply varying the composition of the expandable print paint.

A refinement of the present invention contemplates the coating of the cellular vinyl layer with a thin film of clear or pigmented vinyl sheeting. This sheet is not to be confused with a supporting layer, but instead is used with the supporting layer on the opposite side of the product. Thus, the product of the present invention may have a wearing surface comprising a clear or pigmented vinyl sheet, a cellular layer, and a supporting layer. The vinyl wearing surface may be readily affixed at a convenient time during the manufacture of the product. It may be added subsequent to the fusion operation by fusing the sheet to the cellular layer or by doctoring onto the top of the cellular layer a vinyl plastisol or organosol and carrying out the necessary heating step.

The following examples illustrate several specific embodiments of the invention. All parts are by weight unless otherwise stated.

*Example I*

A paint of the following formulation was prepared:

| | Parts |
|---|---|
| Geon 121 (polyvinyl chloride of particle size averaging less than 5 microns) | 717.50 |
| Tricresyl phosphate | 179.41 |
| Paraplex G-62 (epoxidized soya bean oil) | 358.75 |
| MPS-500 (chlorinated fatty acid ester) | 179.41 |
| Thermalite (thio-organo-tin compound) | 8.4 |
| BL-425 (sodium alkyl sulfonate in DOP) | 45.15 |
| BL-353 (N,N dimethyl, N,N dinitroso terephthalamide, 70% in mineral oil) | 156.31 |

Portions of the above plastisol were admixed with a flock of gray, green, red, and white colors, respectively. The various colors were thinned with Solvesso 100 (a hydrocarbon solvent) to form organosols. Using print blocks, the different-colored paints were impressed in varying designs on sheets of tightly woven glass fibers. Printed sheets containing two and more colors in varying designs were prepared; the fibers were of varying thicknesses.

When cured for 20 minutes at 325° F., the paints foamed in varying amounts, thus yielding a product wherein the tough, attractive cellular vinyl layer presented an embossed appearance.

*Example II*

The following compositions were prepared:

| | Clear | Blue |
|---|---|---|
| Geon 121 | 200 | 200 |
| Tricresyl phosphate | 90 | 90 |
| UF240N (urea-formaldehyde resin, 60% in naphtha) | 4 | 4 |
| Solvesso 150 (aromatic hydrocarbon solvent) | 20 | 20 |
| Advance 89-X (organic cadmium salt) | 3 | 3 |
| Advance CH-20 (alkyl aryl phosphate) | 2 | 2 |
| Blue | | 4 |
| Black | | 1 |
| Yellow | | 0.5 |

A printed clear organosol film was prepared using a block with over-all print design and the film was precured for one minute at 200° F. A design was then partially printed in blue and partially printed in a foamable yellow composition on the clear organosol. The foamable yellow composition had the following formulation:

| | |
|---|---|
| Geon 121 | 100 |
| Kenflex A (aromatic hydrocarbon resin) | 38 |
| Paraplex G-53 (polyester type plasticizer) | 38 |
| Tricresyl phosphate | 24 |
| Tribase (tribasic lead sulfate) | 2.5 |
| Celogen AZ (azo-di-carbonamide) | 5 |
| BL-353 | 10 |
| BL-425 | 7 |
| Yellow | 8 |

The blue and yellow printed vinyl film was given two 15-second preheats with 15-second intervals under a Sill heater maintained at 700° F. and then passed twice through the Sill heater maintained at 700° F. to form the final product.

The final product was strong, tough, flexible, and presented an embossed appearance on its cellular side.

*Example III*

The following formulation was prepared:

| | |
|---|---|
| Geon 121 | 100 |
| Dioctyl phthalate | 30 |
| Paraplex G-53 | 45 |
| Tribase | 2 |
| BL-353 | 13 |
| BL-425 | 7 |
| Celogen [p,p' oxybis (benzene sulfonyl hydrazide)] | 3 |
| Mica | 20 |

The above plastisol was broken into aliquots and varying small additional amounts of Celogen were added to the different portions. Designs were hand printed on a felt backing using the plastisol containing different amounts of blowing agent.

On subsequently passing the product through the Sill heater twice while maintained at 700° F., a surface covering was obtained wherein portions of the design were raised higher than other portions of the design, thus presenting an embossed effect.

I claim:

1. The method of making a surface covering having a cellular vinyl layer presenting an embossed appearance and a supporting layer therefor, which method comprises printing a plurality of polyvinyl halide compositions in a design on a supporting layer to completely cover said sheet, at least one of said compositions being a foamable composition comprising polyvinyl halide resin, plasticizer, and a blowing agent, and thereafter heating said compositions to decompose said blowing agent and fuse said polyvinyl halide whereby at least one of said compositions printed in said design possesses a thickness different from other printed compositions in said design.

2. The method according to claim 1 wherein all of said polyvinyl halide compositions are foamable compositions.

3. The method according to claim 2 wherein each of said foamable compositions contains a different amount of blowing agent.

4. The method according to claim 2 wherein said foamable compositions contain different blowing agents.

5. The method according to claim 1 wherein said compositions are printed in designs having different film thicknesses.

6. The method of making a surface covering having a cellular vinyl layer and a vinyl supporting layer therefor, which method comprises forming an unfoamed polyvinyl resinous sheet, printing on said sheet a plurality of polyvinyl halide compositions to completely cover said sheet, at least one of which comprises polyvinyl chloride, a plasticizer, and a blowing agent, and thereafter heating said compositions to decompose said blowing agent and fuse said polyvinyl chloride whereby at least one of said compositions printed on said sheet possesses a thickness different from other compositions printed on said sheet.

7. A tough, flexible, wear-resistant surface covering having an embossed appearance comprising a supporting layer and a layer comprising a plurality of polyvinyl halide resin compositions printed thereon and completely covering said supporting layer, at least one of said compositions having a cellular structure and being of a thickness different from that of at least one other of said compositions.

References Cited in the file of this patent

UNITED STATES PATENTS

| 2,579,044 | Kober | Dec. 18, 1951 |
| 2,737,503 | Sprague et al. | Mar. 6, 1956 |
| 2,746,940 | Cooper et al. | May 22, 1956 |

FOREIGN PATENTS

| 576,389 | Germany | May 10, 1933 |
| 684,708 | Great Britain | Dec. 24, 1952 |